(12) United States Patent
Klesing

(10) Patent No.: US 6,597,139 B1
(45) Date of Patent: Jul. 22, 2003

(54) DRIVE DEVICE AND METHOD FOR MOVING A VEHICLE PART

(75) Inventor: Joachim Klesing, München (DE)

(73) Assignee: Webasto Dachsysteme GmbH, Stockdorf (DE)

( * ) Notice: Subject to any disclaimer, the term of this patent is extended or adjusted under 35 U.S.C. 154(b) by 0 days.

(21) Appl. No.: 09/786,392

(22) PCT Filed: Sep. 3, 1999

(86) PCT No.: PCT/EP99/06510

§ 371 (c)(1),
(2), (4) Date: Jul. 2, 2001

(87) PCT Pub. No.: WO00/14845

PCT Pub. Date: Mar. 16, 2000

(30) Foreign Application Priority Data

Sep. 3, 1998  (DE) ........................................ 198 40 161

(51) Int. Cl.⁷ .............................................. H02H 7/08
(52) U.S. Cl. ................... 318/445; 318/174; 318/280; 318/282; 318/283; 318/432; 318/466; 318/467; 318/468; 318/469; 701/49
(58) Field of Search ................... 318/174, 280, 318/283, 432, 466, 469, 445, 467, 468, 282; 701/49; 49/28, 29, 139

(56) References Cited

U.S. PATENT DOCUMENTS

| | | | |
|---|---|---|---|
| 4,468,596 A | * 8/1984 | Kinzl et al. | 318/287 |
| 5,278,480 A | 1/1994 | Murray | |
| 5,404,673 A | * 4/1995 | Takeda et al. | 49/28 |
| 5,596,253 A | * 1/1997 | Mizuta et al. | 318/469 |
| 5,701,063 A | * 12/1997 | Cook et al. | 318/469 |
| 5,723,960 A | * 3/1998 | Harada | 318/469 |
| 5,925,996 A | * 7/1999 | Murray | 318/471 |
| 5,963,001 A | * 10/1999 | Peter et al. | 318/563 |
| 5,982,124 A | * 11/1999 | Wang | 318/466 |
| 5,994,858 A | * 11/1999 | Miura | 318/283 |
| 6,070,116 A | * 5/2000 | Pruessel et al. | 701/49 |
| 6,100,657 A | * 8/2000 | Lamm et al. | 318/280 |
| 6,140,785 A | * 10/2000 | Hogler | 318/282 |
| 6,194,855 B1 | * 2/2001 | Lochmahr et al. | 318/283 |
| 6,225,770 B1 | * 5/2001 | Heinrich et al. | 318/463 |

FOREIGN PATENT DOCUMENTS

| | | | | |
|---|---|---|---|---|
| DE | 29 26 938 | | 1/1981 | |
| DE | 40 00 730 A1 | | 8/1991 | |
| DE | 41 09 867 A1 | | 10/1992 | |
| DE | 41 09 867 C2 | | 10/1992 | |
| DE | 43 12 865 A1 | | 11/1993 | |
| DE | 43 21 264 C2 | | 1/1994 | |
| DE | 43 33 675 A1 | | 4/1995 | |
| DE | 195 11 581 C2 | | 10/1995 | |
| DE | 195 11 581 A1 | | 10/1995 | |
| DE | 195 14 257 C1 | | 7/1996 | |
| DE | 196 18 219 A1 | | 11/1997 | |
| DE | 198-40-161 A1 | * | 3/2000 | .......... H02H/7/085 |
| EP | 0485-046 A1 | * | 5/1992 | ............ B60J/7/057 |
| EP | 0 422 388 B1 | | 3/1995 | |

* cited by examiner

*Primary Examiner*—Robert E. Nappi
*Assistant Examiner*—Tyrone Smith
(74) *Attorney, Agent, or Firm*—Nixon Peabody LLP; David S. Safran

(57) ABSTRACT

The invention relates to a process for adjusting a motor vehicle part between at least two positions and a drive device for executing this process. The motor vehicle part is driven by an electric motor, and a pulse signal is generated according to the rotary motion of the electric motor which is supplied to a control unit for controlling the electric motor, in which at certain instants the value for the current force acting on the motor vehicle part is determined from the pulse signal. This value of the force is used as the criteria in the decision whether the electric motor is to be turned off or reversed [or not]. Before connection of the electric motor to the motor vehicle part measurements are taken on the electric motor for determining the individual motor characteristics, the measured values determined in this way are used in the determination of the value of the action of force.

14 Claims, 4 Drawing Sheets

DRIVE DEVICE AND METHOD FOR MOVING A VEHICLE PART

BACKGROUND OF THE INVENTION

1. Field of the Invention

The invention relates to a process for adjusting a motor vehicle part between at least two positions, and a drive device for a motor vehicle part which can be adjusted between at least two positions.

2. Description of the Related Art

DE 43 21 264 A1 discloses a generic process and generic drive device in which an electric motor drives a motor vehicle window pane. By means of two Hall sensors which are offset by 90 degrees and which interact with a magnet located on the motor shaft a signal is produced from which the instantaneous period duration of a motor revolution and thus the instantaneous motor rpm are determined at each time at which one such signal enters a control unit for controlling the motor. As soon as the instantaneous rpm change resulting from the difference of two successive rpm measured values exceeds a stipulated threshold value the motor is reversed in order to release a possibly pinched article.

DE 195 11 581 A1 discloses a similar drive device in which the threshold value is variably chosen depending on the position, and a memory for certain positions of the adjustment path, and storing the speed change sampled in an earlier run between two adjacent positions in order to compute the shut-off threshold for the speed from a function of position depending on the last currently determined position and the speed.

DE-OS 29 26 938 discloses acquiring the motor rpm in a sliding roof drive at uniform time intervals, finding the differences of successive values, adding these differences to one another when they are larger than a predetermined threshold value, and triggering the shut-off or reversal of the motor as soon as the added sum exceeds a predetermined threshold value.

DE 43 12 865 A1 discloses a drive device for a motor vehicle window which samples the motor rpm by means of two Hall detectors, and, which when a threshold is exceeded for the relative change of rpm, reverses the motor. In doing so, the threshold value is continually re-computed depending on the sampled motor voltage and the ambient temperature which is determined by a temperature sensor on the motor. The status/operating times of the motor are then considered in order to draw conclusions about the ambient temperature from the motor temperature.

DE 196 18 219 A1 discloses determining the rpm threshold or the rpm change threshold of the motor, from which reversal of the motor takes place, by determining the position-dependent rpm data of a reference run taken place beforehand and depending on the position of the cover for a sliding roof drive.

EP 0 422 388 A1 discloses pinching protection for an adjustable motor vehicle part in which the first derivative of the drive motor torque is added over part of the range of motion of the adjustable motor vehicle part, a boundary value for the sum being used to shut off the drive motor.

U.S. Pat. No. 5,278,480 describes a learning program for a device for opening and closing a garage door.

DE 40 00 730 A1 discloses pinching protection for an adjustable motor vehicle part by the monitoring of the motor rpm or the first derivative of the motor rpm such that pinching will be recognized. The characteristics of the individually used motor, optionally with consideration of the inherent heating of the motor, are determined by connecting the motor to a completely assembled part and then exposing the part to a defined load moment from which the motor rpm is determined. The disadvantage in this pinching protection is that only adaptation of the entire system comprising the motor characteristic, the motor temperature, and the resistance to movement of the adjustable motor vehicle part is possible. This results in a certain amount of inaccuracy in recognition of pinching.

The disadvantage in the above generic systems, which sample the rpm, is that due to individual fluctuations of the characteristics of the motors used, the assignment of the measured rpm to the corresponding motor torque, i.e. the corresponding force acting on the adjustable motor vehicle part, is subject to these random fluctuations; this results in inaccuracies in the determination of a case of pinching.

SUMMARY OF THE INVENTION

The object of this invention is to provide a drive device for a motor vehicle part which can be moved between at least two positions and a process for adjusting a movable motor vehicle part between at least two positions, which will provide better accuracy in the determining whether a case of pinching has been encountered.

In this approach, there is an improvement when fluctuations in the individual motor characteristic of the electric motor utilized can be compensated for such that an accurate determination of the motor torque and thus of the force acting on the adjustable motor vehicle part can be determined, the result of which is that the accuracy in determining whether a case of pinching has occurred can be improved.

In a preferred embodiment, the instant input of each pulse signal on the control unit is measured, from at least some of the previously measured instants one value at a time for the change of the motor rpm is determined, and from each value of the rpm change, when multiplied by a proportionality factor, a force change value is determined which is then used when the value is determined for the instantaneous force acting on the moveable motor vehicle part.

The proportionality factor is chosen as a function of the motor characteristic.

Preferably, the motor characteristic is determined for at least one motor voltage before startup, i.e., without the driven motor vehicle part is assembled, and at a fixed motor voltage, and more preferably two pairs of values of rpm and torque are measured.

Furthermore, the proportionality factor is preferably chosen as a function of the motor temperature, with the motor temperature preferably being estimated by the ambient temperature and the duration of motor operation being measured.

Two embodiments of the invention are detailed below using the attached drawings.

DETAILED DESCRIPTION OF THE INVENTION

Figure 1:
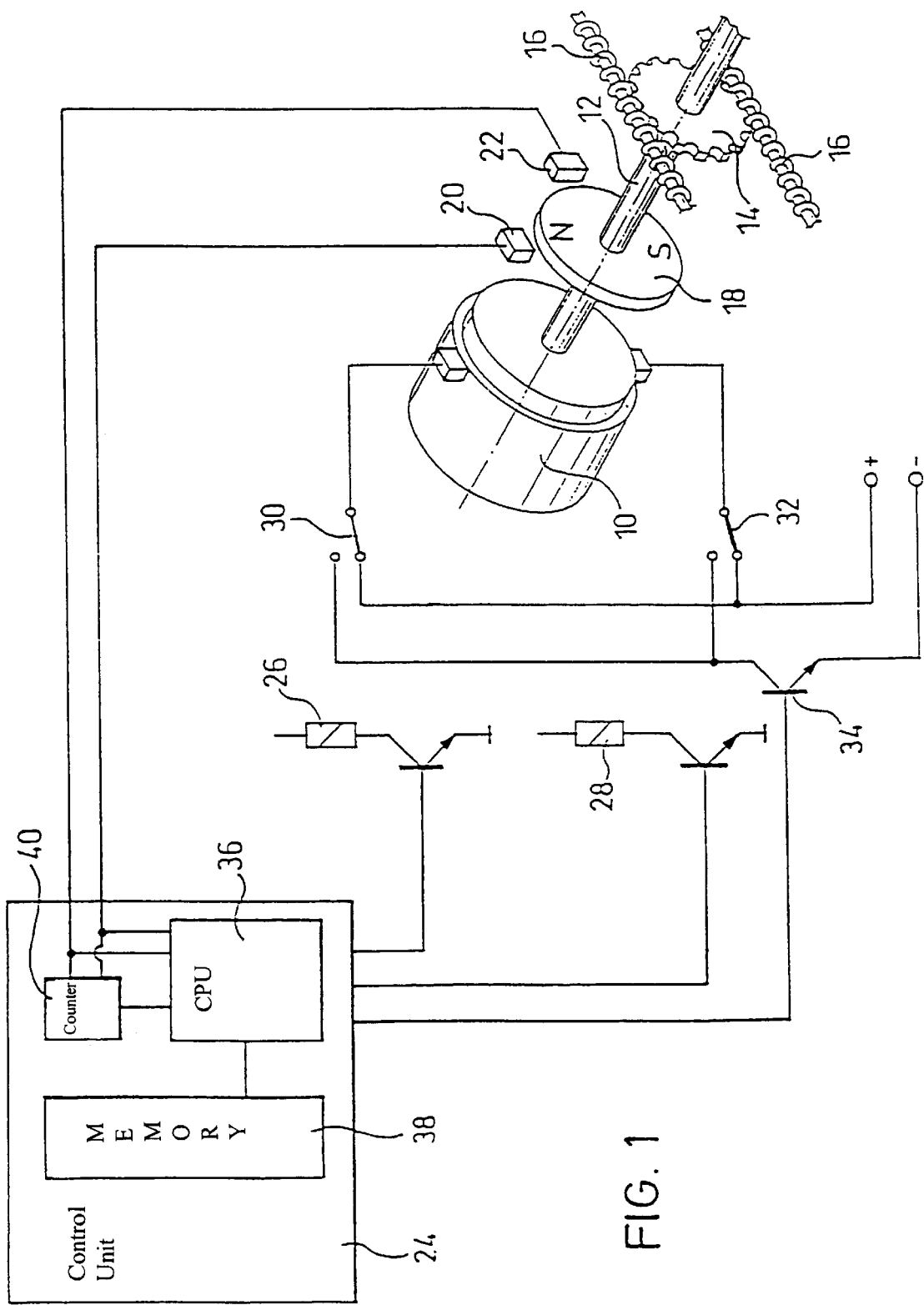
FIG. 1 illustrates a schematic of a drive device of one embodiment of the invention, FIG. 2 sets forth a graphic representation of a sample time behavior of the period duration of a motor revolution.
Figure 4:
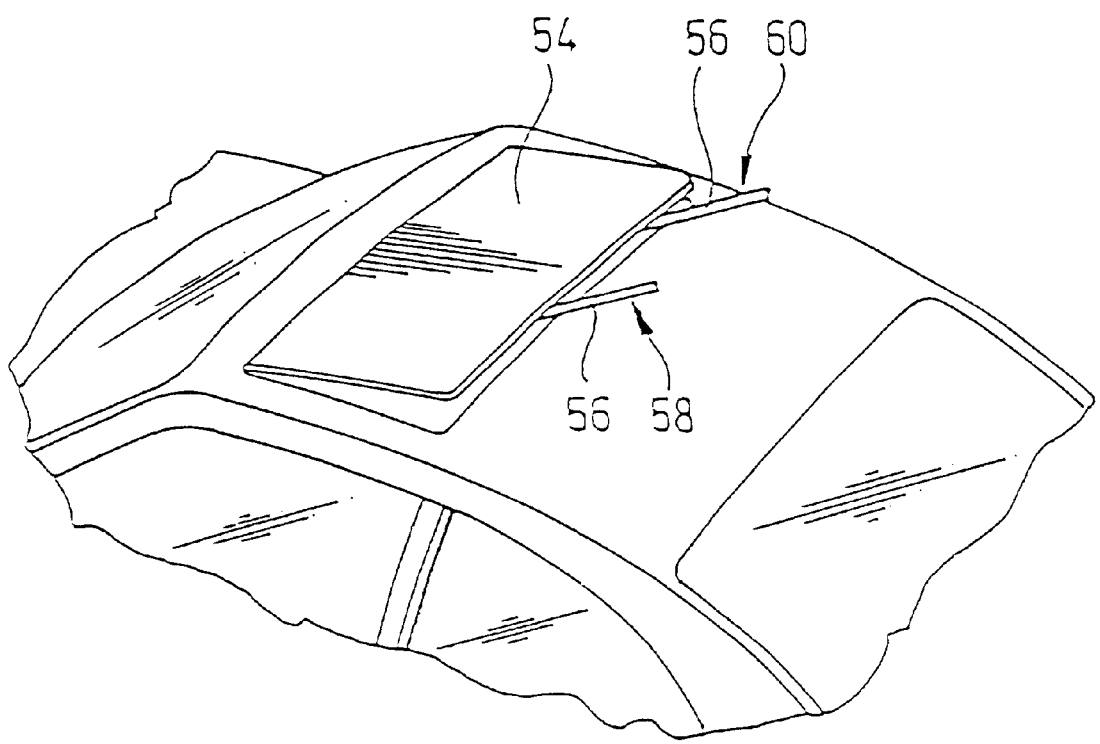
FIG. 4 shows a motor vehicle roof used for illustration of the process as shown in FIG. 3.

With reference to FIG. 1, an electric motor 10, which is a DC motor, drives via a shaft 12 a pinion 14 which engages two drive cables 16 that are guided to be resistant to tension and compression. Between the electric motor 10 and the pinion 14 there is optionally another worm gear pair which is not shown. The movable covers 54 of the sliding motor vehicle roof, currently constructed as a sliding and lifting roof or spoiler roof, are generally driven by means of these drive cables 16. The window raisers of a motor vehicle door often act via a cable drum and a smooth cable attached to the movable part, i.e. the window. It is not relevant for the following discussion how the force is applied to the movable motor vehicle part. However, for the sake of illustration and clarity of this embodiment the driven cover 54 of a sliding and lifting roof is shown in FIG. 4.

A magnet wheel 18 with at least one south pole and one north pole is mounted torsionally firm on the shaft 12. Of course there can also be several poles, for example four north poles and four south poles, on the magnet wheel 18, by which the duration of the period of the signals is shortened accordingly. In the peripheral direction, offset by roughly 90 degrees there are two Hall sensors 20, 22 disposed near the magnet wheel 18 each of which deliver a pulse signal for each passage of the north and south pole of the magnet wheel 18 to a control unit 24. The control unit 24 is provided with a microprocessor 36 and a memory 38 and which receives a signal for roughly each quarter revolution of the shaft 12. The period duration is determined from the interval of two successive signals from the same sensor 20 and 22 and which are part of the interval of one complete revolution of the shaft 12. Due to the 90 degree arrangement of the two sensors 20, 22, the period duration is computed alternatingly from the time difference of the last two signals from the sensor 20 and 22 such that for each quarter revolution a new value of the period duration is available. From this method of determining the period duration, deviations from the exact 90 degree geometry of the sensor arrangement have no effect on the period duration, which would be the case when the period duration is determined from the time difference between the last signal of one sensor and of the other sensor.

As a result of the phase shift of the signals of the two sensors 20, 22, the direction of rotation can also be determined. In addition, the current position of the cover 54 can be determined from the signals of the Hall sensors 20, 22 by supplying the signals to a counter 40 which is assigned to the control unit 24.

The direction of rotation of the electric motor 10 can be controlled by the control unit 24 via two relays 26, 28 with reversing contacts 30, 32. The rpm of the motor 10 will be controlled by pulse width modulation via a transistor 34 which is triggered by the control unit 24.

From the instant of signal input from the Hall sensors 20 and 22, the microprocessor 36 determines the instantaneous period duration of the revolution of the shaft 12 and thus of the electric motor 10. Thus approximately for each quarter turn of the shaft 12 a measured value for the period duration is available. To also ensure pinching protection between these instants, estimated values for the period duration are continuously extrapolated in a fixed time reference, for example after each 1 ms, from preceding measured values of the period duration, for example by the following formula $$T^*[k] = T[i] + k \cdot (a1 \cdot T[i-1] + a2 \cdot T[i-2] + a3 \cdot T[i-3]) \quad (1)$$

where a1, a2, a3 are parameters, i being an index which for each signal input is incremented, i.e., for each quarter period, and k being the running index of the fixed time reference which is reset to zero for each newly measured value for the period duration. Instead of the last four measured values, more or fewer measured values can be considered depending on the requirements, for example only the last two values are considered.

Figure 2:
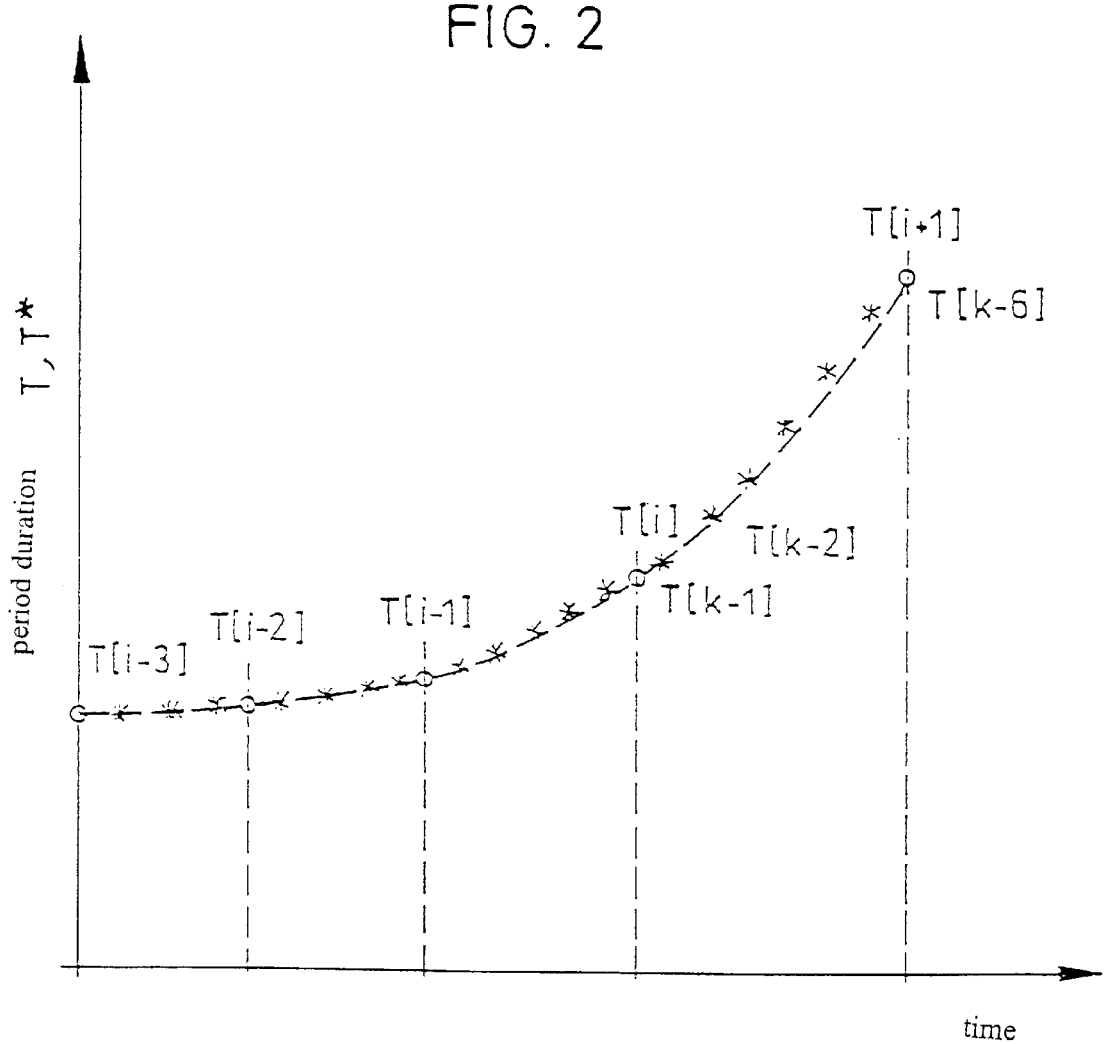

The parameters a1, a2, a3 model the entire system of the drive device, i.e. the motor 10, the force transmission components and the cover 54, and are determined by the spring stiffness, damping and friction of the entire system. This yields bandpass action with the property that portions of the period time behavior caused by vibrations are evaluated more weakly than those originating from a case of pinching. FIG. 2 schematically shows the sample time behavior of the measured period durations T and the period durations T* which have been estimated therefrom. The broken-line curve represents the true behavior of the period duration.

From the estimated values for the period duration, which have been determined in this manner, the motor rpm change at time [k] relative to the preceding instant [k-1] is estimated, with a motor voltage filter and a path profile filter being used to eliminate the effects of the motor voltage and the position at which the movable motor vehicle part, i.e. the cover, is in fact located, the following formula being used:

$$\Delta N^*[k] = (T^*[k] - T^*[k-1])/(T^*[k])^2 - Vu(Um[k]) - Vr(x[k]) \quad (2)$$

Um[k] is the motor voltage at time [k], Vu is the motor voltage filter which simulates the relationship between the rpm and the motor voltage which has been received by the control unit 24, x[k] is the position of the cover at time [k], and Vr is a path profile filter which simulates the relationship between the motor rpm and the position of the cover.

The motor voltage filter Vu simulates the dynamic behavior of the motor for voltage changes. Preferably, the motor voltage filter Vu is made as a lowpass filter with a time constant which is equal to the motor time constant. The time constant is dependent on the operating situation, i.e. on the opening or closing of the cover 54 in the sliding or lowering direction, and is dependent on the magnitude of the voltage change.

The path profile filter Vr is automatically determined by a learning run after the drive device is installed. By doing this, multiple adaptations to altered operating conditions, i.e., due to wear, during the service life of the system is possible within certain intervals. Further, instead of an individual learning run, statistical averages determined for several (for example 50) learning runs can be used for data recovery for the path profile filter. The position of the cover 54 is, as mentioned above, determined from the pulse signals of the Hall sensors 20, 22 which are summed up by means of the counter 40.

The determination as to whether a case of pinching is present or not is made using the following formula:

$$\Sigma(Vf \cdot \Delta N^*[k]) = \Sigma(\Delta F[k]) > Fmax \quad (3)$$

The estimated rpm changes $\Delta N^*[k]$ are compared to a fixed, time-constant lower boundary. As soon as the estimated run changes exceed this lower boundary, they are each multiplied by a proportionality factor Vf which reproduces the slope of the motor characteristic of the electric motor 10 (torque over rpm). At a constant motor voltage and motor temperature the slope is roughly constant, but for each electric motor 10 it is individually different. To eliminate these effects, a temperature sensor samples the ambient temperature and the motor temperature is determined via the determination of the operating duration. As an alternative, the ambient temperature can also be directly determined by a temperature sensor on the electric motor 10. On the other hand, for each electric motor 10 before assembling with the cover 54, and within the framework of the final production check at a constant motor voltage, two pairs of values for rpm and torque are determined and stored in a memory 38. From these measured values, the increase of the motor characteristic is determined, from which the proportionality factor Vf is computed.

The product of $\Delta N^*[k]$ and Vf corresponds to the change $\Delta F[k]$ of the force acting on the displacement motion of the cover 54 at time $[k]$ relative to the instant $[k-1]$.

The values of $\Delta F[k]$ are added up as long as the values of $\Delta N^*[k]$ are above the fixed lower boundary. As soon as two successive $\Delta N^*[k]$ values are again below the fixed lower boundary, the sum is set to zero. If the $\Delta N^*[k]$ value exceeds a fixed upper boundary, in place of this $\Delta N^*[k]$ only the value of the upper boundary is included in the sum. This is done to eliminate, as much as possible, the effects of vibrations which lead to brief periodic peaks of the rpm change upon the recognition of a instance of pinching. This upper boundary can be chosen to be constant in the simplest case. However, in order to increase the accuracy of triggering, the upper limit can also be chosen differently in time depending on the currently determined rpm change, for example in the manner that the upper limit is raised as the current rpm change rises.

As soon as the sum of $\Delta F[k]$ exceeds a maximum allowable pinching force Fmax, the control unit 24 by triggering the relays 26, 28 via the switches 30, 32 initiates reversal of the electric motor 10 in order to again immediately release the pinched article or the pinched body part.

Due to the above described extrapolation of the period durations, the pinching protection is also active between the two measured values of the period duration at fixed instants, in which case pinching can be recognized earlier, i.e. at a lower pinching force; which better prevents damage or injuries and thus increases the safety of the drive device.

To further reduce the probability of faulty activation when vibrational forces occur, spectral analysis of the rpm changes determined within a certain time window up to the instant of the analysis can be undertaken. When certain spectral characteristics occur, especially when a clearly pronounced peak occurs which is not in the spectral range typical for cases of pinching, triggering is prevented even if the threshold Fmax is exceeded.

Figure 3:
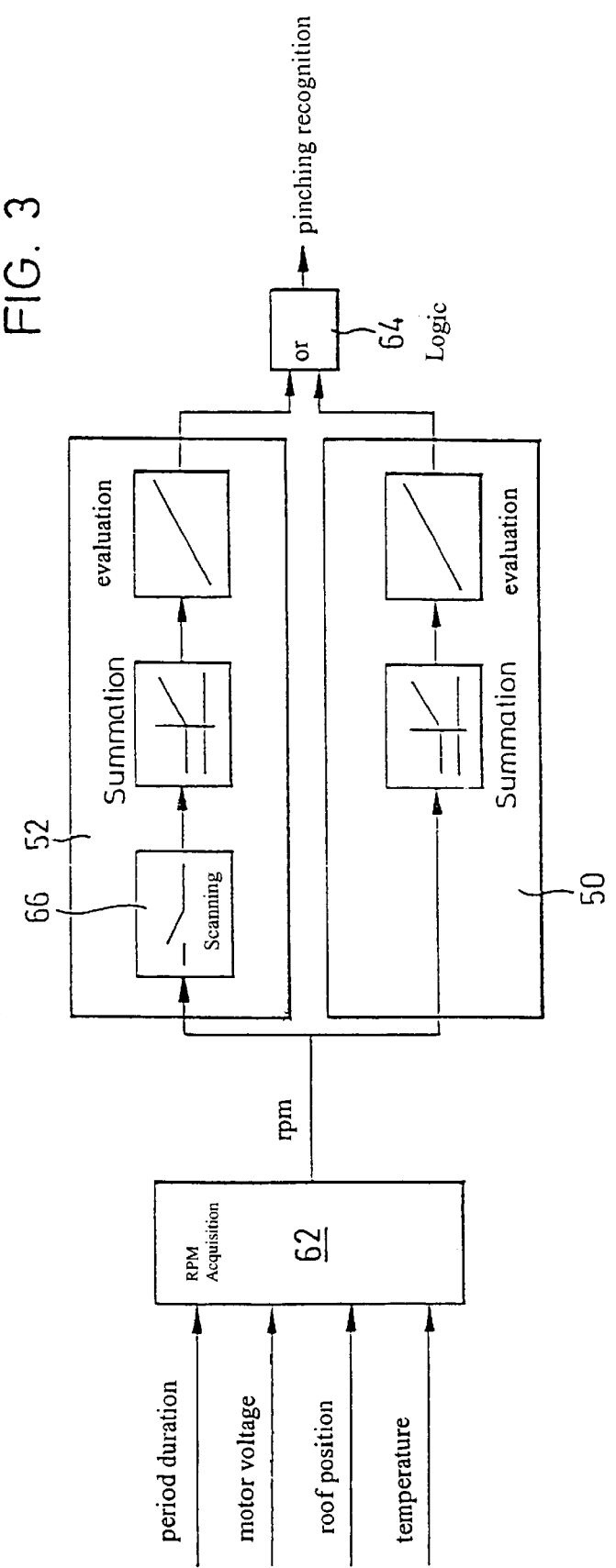
FIG. 3 illustrates a schematic of another process embodiment of the invention for determining a case of pinching.

FIG. 3 schematically shows a second embodiment of the invention. The major difference from the above described first embodiment is that parallel and independent of the extrapolation of the measured period durations at certain times and independent of the determination of estimated values for the force acting on the adjustable motor vehicle part in a first computation 50, a second computation 52 is carried out with its own set of parameters and with a different scanning rate which delivers the value for the instantaneous action of the force. For the decision whether the motor is to be turned off or reversed, the results of the two computations are considered. This results from the following considerations.

The stiffness of the entire system comprises the stiffness of the sliding and lifting roof mechanism, of the pinched body, and of the motor vehicle body. On the one hand, the stiffness of the pinched body depends on the type of body, also, the stiffness of the body depends largely on the location at which the body is pinched. This applies especially in the lowering motion of the cover 54 from a raised position, see FIG. 4. If, in doing so, a body 56 is pinched in the area of the middle of the roof (indicated in FIG. 4 at 58), the effect on the entire system based on the possible deflection of the rear edge of the cover is much milder than for pinching in the edge area (indicated in FIG. 4 at 60).

The scanning rate is hereinafter defined as the interval of the instants at which the value for the instantaneous action of the force is determined. If the system is working with a single fixed scanning rate, the set of parameters of the computation, especially the threshold values or the boundary values, and the selected scanning rate can be optimized only for a single stiffness of the entire system, but in practice, depending on the type and location of the pinched body, a difference in stiffness of the entire system can be decisive.

By carrying out a second parallel computation 52, it is possible to optimize this second computation 52 for another stiffness through the corresponding choice of the computation parameters and the scanning rate underlying the computation, i.e. the choice of the instants at which a new value of the instantaneous action of force is computed.

The second computation 52 is preferably optimized to determine slow changes of the action of force, i.e. small stiffness, while the first computation 50 is optimized to determine fast changes of the action of force, i.e. high stiffness.

Generally, in the secondary computation 52 it is not necessary to extrapolate the measured values of the period duration, however, depending on the relevant stiffness range, that is in a case after input of a new measured value or only after each n-th input of the measured value, the computation 52 of the new value of the instantaneous action of force is done. Basically, and if necessary, the second computation 52 can use an extrapolation algorithm, where the extrapolation instants are chosen at a greater interval than in the first computation 50.

As shown in FIG. 3, in the rpm determination stage 62 is determined from the input values period duration T, the motor voltage, the cover position x, and the motor temperature according to the aforementioned formulas (1) and (2) with the first (higher) scanning rate, i.e. at the measurement instants [i] and the extrapolation instants [k], the current rpm change $\Delta N^*$ or the current rpm $N^*$ (this results from $N^*[k]=1/T^*[k] - Vu(Um[k]) - Vr(x[k]$; instead of $[k]$, there can also be $[i]$). Furthermore, the motor temperature, when determining the rpm in the conversion from the change in rpm to the change in force, is taken into account according to equation (3). The first scanning rate is chosen such that it is optimum for the determination of cases of pinching when the highest system stiffness is to be expected. The rpm determination stage 62 is used jointly by the first computation 50 and the second computation 52.

In the first computation 50, it is ascertained from the rpm change $\Delta N^*$ by means of the formula (3) in the aforementioned manner using the first value for the fixed lower boundary, the first value for the fixed upper boundary, and the first value for the threshold value Fmax at the instants which have been established by the first scanning rate, i.e. the extrapolation instants [k], whether the instantaneous action of the force exceeds this first threshold value Fmax. The values of this first parameter set are optimized for the determination of cases of pinching when the largest system stiffness is to be expected.

In the second computation 52, the scanning rate is chosen such that it is optimum for determination of cases of pinching when the lowest system stiffness are to be expected. This second scanning rate can be chosen for example such that only each fourth measured value of the period duration T is considered. In this situation, the second computation is performed only for each fourth signal input from the Hall sensors 20, 22, i.e. only each fourth rpm N[i] which is determined by the stage 62 and which goes back to the measured period duration T is considered in the scanning stage indicated at 66 in FIG. 4 (indicated in FIG. 4 by 66) and which goes back to the measured period duration T. The rpm N*[k] which has been determined from the extrapolated period durations T* are of course ignored. The second computation 52 is therefore carried out only at each fourth instant [i].

Initially, the change of rpm ΔN[i] is determined relative to the last measured value. Then, analogously, by means of the equation (3) using a second value for the fixed lower boundary, a second value for the fixed upper boundary, and a second value for the threshold value Fmax, it is established whether the instantaneous action of force exceeds this second threshold value Fmax. The values of this second parameter set are optimized for determination of cases of pinching when the smallest system stiffness is to be expected.

For the determination as to whether there is a case of pinching, i.e. the motor is to be turned off or reversed, the results of the first and the second computation are logically combined with one another in the logic stage 64. In the simplest case, this is an OR operation. Therefore in that situation, the motor is turned off or reversed when one of the two computations indicates a case of pinching. This decision is made at each instant at which the first computation 50 delivers a new result. Since new results of the second computation 52 are present much more rarely, the last result of the second computation 52 is supplied to the logic stage 64.

Both fast and subtle changes of the action of the forces can be optimally determined by the combination of the results of the two computations 52, 54.

What is claimed is:

1. A process for displacing a motor vehicle part between at least two positions comprising the steps of:
    prior to connection of an electric motor to the motor vehicle part, taking measurements on the electric motor for determining an individual motor characteristic,
    driving the motor vehicle part with the electric motor,
    generating a pulse signal according to rotary motion of the electric motor,
    inputting said signal to a control unit for controlling the electric motor,
    determining a value of a current force acting on the motor vehicle part at certain instants from the generated pulse signal, and the value of the determined individual motor characteristic, and
    using the determined value of the current force as a criteria in determining whether the electric motor is turned off or reversed.

2. Process as set forth in claim 1, comprising the further steps of calculating a current force change value (<F[k]), the instant each pulse signal is inputted to the control unit, from a previously determined value of the current force by determining a respective rpm change value which is indicative of a change of the motor rpm (<N*[k]), and by multiplying the change value with a proportionality factor (Vf) to determine an instantaneous current force acting on the motor vehicle part.

3. Process as set forth in claim 2, wherein the proportionality factor (Vf) is selected as a function of the motor characteristic.

4. Process as set forth in claim 3, wherein the motor characteristic is determined by measuring two pairs of values of motor rpm and motor torque at a fixed motor voltage.

5. Process as set forth in claim 2, wherein the proportionality factor is chosen as a function of motor temperature.

6. Process as set forth in claim 5, wherein the motor temperature is estimated from ambient temperature and duration of operation of the electric motor.

7. Process as set forth in claim 2, wherein the values of the force change are summed when an estimated rpm change exceeds a lower threshold value.

8. Process as set forth in claim 7, wherein, when the estimated rpm change (<N*[k]) exceeds an upper threshold value, the upper threshold value replaces the estimated rpm change in the summation of the force change value (<F[k]).

9. Process as set forth in claim 8, wherein the upper threshold value is selected as a function of at least some of recently determined values of the estimated rpm change (<N*[k]).

10. Process as set forth in claim 2, wherein the value for the instantaneous current force acting on the motor vehicle part is determined between two pulse signal input instants at certain extrapolated instants.

11. Process as set forth in claim 10, wherein upon inputting of a new pulse signal, a current period duration (T[i]) of motor rotation is determined from the difference between the new pulse signal and at least one earlier pulse signal measured value, the measured value of the current period duration (T[i]) of the motor revolution is determined such that, at each extrapolation instant ([k]), an estimate of the current period duration (T* [k]) is determined from at least one previously measured period duration (T[i-1], T[i-2], (T[i-3]) and the estimated period durations are determined from the estimated rpm change (<N*[k]).

12. Process as set forth in claim 1, wherein the motor is turned off or reversed by the control unit as soon as the value of the current force acting on the motor vehicle part exceeds a predetermined trigger threshold.

13. A drive device for a motor vehicle part which can be moved between at least two positions, comprising:
    an electric motor for driving the motor vehicle part,
    means for producing a pulse signal according to rotary motion of the motor,
    a control unit for receiving the pulse signal and for controlling the electric motor,
    wherein the control unit is adapted to determine, at a certain instant, a value of a current force acting on the motor vehicle part from the pulse signal, to use the value of the current force acting on the motor vehicle part as a criteria in determining whether the electric motor is turned off or is reversed, and
    wherein the control unit is adapted to use measured values of at least one motor characteristic taken on the electric motor before connection of the electric motor to the motor vehicle part in determining the value of the current force.

14. Drive device as set forth in claim 13, wherein the control unit is adapted to calculate a force change value ($<F[k]$), at the instant each pulse signal is received by the control unit, from previously determined values of current force by determining a respective value which is indicative of the change of the motor rpm ($<N^*[k]$), and by multiplying the respective value which is indicative of the change of the motor rpm value with a proportionality factor (Vf) to determine the instantaneous current force acting on the motor vehicle part.

* * * * *